US012713126B2

(12) United States Patent
Pribble et al.

(10) Patent No.: US 12,713,126 B2
(45) Date of Patent: Aug. 18, 2026

(54) DYNAMIC MINIMUM FOCUS THRESHOLD DETERMINATION INSIDE A REGION OF INTEREST IN AN IMAGE

(71) Applicant: Capital One Services, LLC, McLean, VA (US)

(72) Inventors: Jason Pribble, McLean, VA (US); Erik Neighbour, Arlington, VA (US); Daniel Alan Jarvis, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/761,768

(22) Filed: Jul. 2, 2024

(65) Prior Publication Data

US 2025/0008214 A1 Jan. 2, 2025

Related U.S. Application Data

(63) Continuation of application No. 17/550,489, filed on Dec. 14, 2021, now Pat. No. 12,035,039.

(51) Int. Cl.

| | |
|---|---|
| ***H04N 23/60*** | (2023.01) |
| ***G06T 7/00*** | (2017.01) |
| ***G06T 7/12*** | (2017.01) |
| ***G06T 7/194*** | (2017.01) |
| ***H04N 23/63*** | (2023.01) |

(52) U.S. Cl.

CPC ........... *H04N 23/64* (2023.01); *G06T 7/0002* (2013.01); *G06T 7/12* (2017.01); *G06T 7/194* (2017.01); *H04N 23/632* (2023.01); *G06T 2207/20132* (2013.01); *G06T 2207/30168* (2013.01); *G06T 2207/30176* (2013.01)

(58) Field of Classification Search

CPC ...... H04N 23/64; H04N 23/632; H04N 23/61; G06T 7/0002; G06T 7/12; G06T 7/194; G06T 2207/20132; G06T 2207/30168; G06T 2207/30176; G06T 7/60; G06T 7/73; G06T 2207/10016; G06T 2207/10024

See application file for complete search history.

(56) References Cited

U.S. PATENT DOCUMENTS

| | | | |
|---|---|---|---|
| 8,452,689 | B1 | 5/2013 | Medina, III |
| 8,995,012 | B2 | 3/2015 | Heit et al. |
| 9,596,398 | B2 | 3/2017 | Khawand |

(Continued)

*Primary Examiner* — Yogesh K Aggarwal
(74) *Attorney, Agent, or Firm* — Sterne, Kessler, Goldstein & Fox P.L.L.C.

(57) ABSTRACT

Embodiments disclosed are directed to a computing system that performs steps for automatically capturing images. The computing system receives an automatic image capture control signal from an application installed on a device and captures, by a camera of the device during a predetermined time interval, preview frames of an object and a background. For each of the preview frames, the computing system identifies an outline of the object in the preview frame, removes the background of the preview frame based on the outline to generate a modified preview frame, and determines a focus value of the modified preview frame. Subsequently, the computing system determines whether a predetermined amount of focus values are greater than a threshold focus value corresponding to the device and, if so, automatically captures, via the camera, an image of the object.

17 Claims, 10 Drawing Sheets

(56) References Cited

U.S. PATENT DOCUMENTS

| | | | |
|---|---|---|---|
| 9,672,510 | B2 | 6/2017 | Roach et al. |
| 9,946,923 | B1 | 4/2018 | Medina |
| 10,262,220 | B1 | 4/2019 | Pribble et al. |
| 10,311,554 | B2 | 6/2019 | Nanu et al. |
| 10,331,966 | B1 | 6/2019 | Pribble et al. |
| 10,339,374 | B1 | 7/2019 | Pribble et al. |
| 10,402,944 | B1 | 9/2019 | Pribble et al. |
| 10,460,191 | B1 | 10/2019 | Pribble et al. |
| 10,515,266 | B1 | 12/2019 | Jarvis et al. |
| 10,635,898 | B1 | 4/2020 | Pribble et al. |
| 10,848,665 | B1 | 11/2020 | Prasad et al. |
| 10,956,728 | B1 | 3/2021 | Voutour |
| 11,055,505 | B2 | 7/2021 | Powers et al. |
| 11,175,809 | B2 | 11/2021 | Capurso et al. |
| 11,373,149 | B1 | 6/2022 | Bueche, Jr. et al. |
| 11,625,933 | B2 | 4/2023 | Patil et al. |
| 2014/0032406 | A1* | 1/2014 | Roach .................. G06Q 20/042 705/42 |
| 2019/0370988 | A1* | 12/2019 | Anderson .............. G06V 20/62 |
| 2020/0380626 | A1 | 12/2020 | Capurso et al. |
| 2020/0380627 | A1 | 12/2020 | Jarvis et al. |
| 2020/0387702 | A1 | 12/2020 | Pribble et al. |
| 2020/0389600 | A1 | 12/2020 | Capurso et al. |
| 2022/0414370 | A1 | 12/2022 | Pribble et al. |
| 2023/0046591 | A1 | 2/2023 | Neighbour et al. |
| 2023/0188833 | A1 | 6/2023 | Pribble et al. |
| 2024/0046709 | A1 | 2/2024 | Patil et al. |

* cited by examiner

200

DYNAMIC MINIMUM FOCUS THRESHOLD DETERMINATION INSIDE A REGION OF INTEREST IN AN IMAGE

CROSS-REFERENCE TO RELATED APPLICATIONS AND INCORPORATION BY REFERENCE

This is a Continuation Application of U.S. application Ser. No. 17/550,489, filed on Dec. 14, 2021, which is incorporated by reference in its entirety.

TECHNICAL FIELD

Embodiments relate to image capture and processing, specifically a system that automatically captures images of documents using mobile device cameras.

BACKGROUND

Some electronic applications may require user authentication or document verification. For example, a user may be asked to provide a government identification card before receiving access to an electronic account. In another example, a user may wish to submit a document for electronic transfer or use, such as a monetary check to be deposited into a bank account. Different entities may allow users to use a mobile device to capture images of such documents and submit those images for verification, authentication, or both. However, these processes may be cumbersome and error prone. For instance, the mobile device may fail to determine whether a valid document is present in the captured images or transmit, to an external server, an image of the document which is not of high enough quality for processing. As a result, the external server may determine that the document in the captured image is invalid or incorrect and subsequently request a different image of a valid or correct document from the mobile device. In this regard, the back and forth transmission of requests and images of documents between the external server and mobile device makes the process inefficient and slow.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art to make and use the embodiments.

DETAILED DESCRIPTION

Figure 1A:
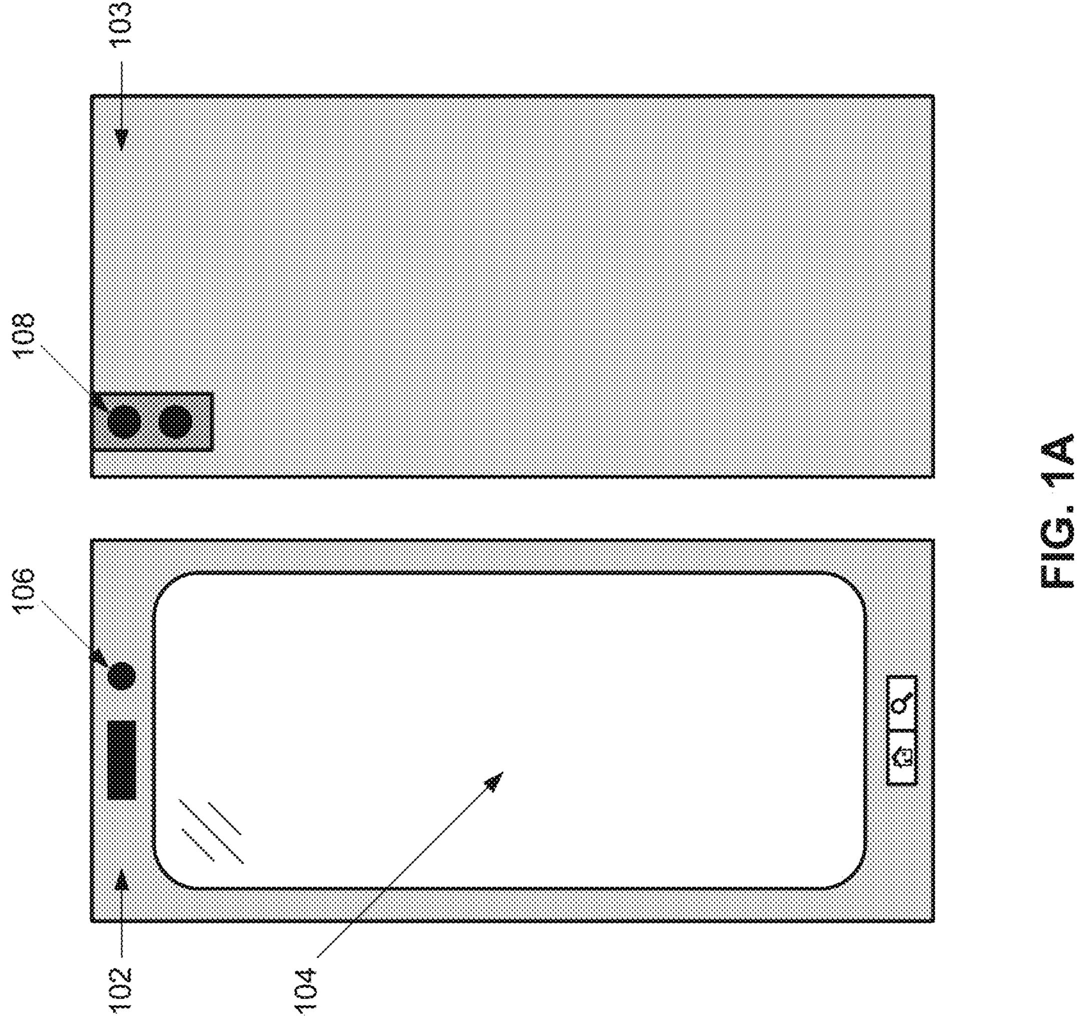
FIGS. 1A, 1B, and 1C illustrate an example device and image capture operations performed by the device according to some embodiments.

Embodiments disclosed herein relate to systems, devices, and methods for automatically ("auto") capturing images of documents, such as government-issued identification cards, using a device, such as a mobile device. As a non-limiting example, entities such as financial institutions may need to verify remotely an identity of a user while the user is interfacing with an application associated with the financial institution. The application may be executing on a mobile device operated by the user. The financial institution may request an image and/or copy of an authentic government-issued identification (ID) card (e.g., driving license, passport, military ID, social security card, etc.).

In one example, analyzing image focus of the entire image using a static minimum focus threshold may not be ideal since the background behind the document can influence focus measurements. Additionally, optimizing a static minimum focus threshold to work well for all mobile devices can be difficult because camera quality varies widely across different mobile devices. For instance, when auto capturing images of an ID, there is a need to ensure that the image is properly focused so that the details of the document are clear and readable. If the image is out of focus, the application may not be able to analyze security features of the document or read barcode data needed to verify the ID. Accordingly, during auto capture, the application may analyze the image's focus and only trigger an image capture if a minimum threshold is met. However, as stated above, mobile devices have a diverse set of camera capabilities and qualities, making it difficult to select a single minimum focus threshold that works well across all mobile devices. Setting a minimum focus threshold too high may work well for newer devices but terribly for older devices that are unable to achieve a minimum focus value that high. Additionally, the background behind the ID further influences the image's measured focus value even when the background is not used to verify the ID because focus value is calculated based on the number of edges detected in an image. As a result, an image of an ID on a solid background with few edges can have a much lower focus value than an image of an ID on a patterned background with many edges.

Described herein are methods, systems, devices, and computer readable media for automatically capturing images. For example, the systems described herein provide for automatically determining whether an object in an image corresponds to a specified document type, such as a government-issued ID card, based on determining a real-world size and an aspect ratio of the object in an image frame. The systems described herein further provide for automatically extracting an image of the object in real-time.

In several embodiments, a device such as a user's smartphone can execute an application installed on the device. The application can automatically capture and transmit an image of the user's identification document. The document can be at least one of, but is not limited to, a government-issued identification card, a health insurance card, an employee identification card, or an identification card issued by a non-government institution. The application can recognize that an object in the image corresponds with a user's identification documentation based on the determined real-world size of the object in the image and the determined aspect ratio of the object in the image. The aspect ratio can correspond to a shape of the object. The application can attempt to verify that both the aspect ratio and real-world size of an object corresponds to a user's identification document so that objects in the image that are of different shapes but the same real-world size as a user identification card are not recognized as user identification documents. The application can compare the determined real-world size and aspect ratio of the object in the image to known standardized sizes of specific identification documents, such as driver's licenses, passports, social security cards, and/or the like. Once the application is able to identify the object in the image is a user's identification document, the application can extract the image of the object and transmit the image to a server for further processing.

In several embodiments, a continuous autofocus feature implemented on the device can provide information regarding the focus of the camera, which can be used by the application to trigger auto capture. The focus value of an image or a region therein can relate to how many edges are detected in an image frame or how well those edges are defined in the preview image frame. For example, the application can analyze a predetermined quantity of the most recent image frames captured by the device to determine whether a properly-focused image can be captured by the device and, in turn, whether and when auto capture can be used to capture the image.

In several embodiments, the application may calculate a dynamic minimum focus threshold inside a region of interest in an image to serve as a better trigger for auto capturing an image of a document (e.g., an ID document) in the region of interest. When auto capturing the image of the document, the application may process a stream of camera preview frames in real-time to determine the best time to capture an image that is in focus. Once a document is detected, the application may, for each camera preview frame: (i) detect the document's area inside the image; (ii) crop the document out of the image or mask the non-document area (e.g., the background) with black pixels; and (iii) determine the focus value for the identified document area. The application may store a history of measured focus values for a given amount of time (e.g., 5 seconds). During this time, the minimum focus threshold for auto-capture may be set high, optimized for the highest quality devices while the application is calculating the optimal minimal focus value threshold to use on the user's specific device and document. Once the application has a history of measured image focus values, the application can analyze the minimum, maximum, mean, standard deviation, and variance values to calculate the minimum focus threshold to be used as a trigger for auto capture. Once the application has calculated a new minimum focus threshold, the application can use that threshold to determine if image preview frames captured by the device's camera are clear enough to trigger auto capture.

The embodiments for automatically capturing images described herein may capture and process multiple images in real-time. Embodiments for automatically capturing images may be executed locally on the device so that a number of images (and thus the amount of data) transmitted between the device and a back-end server for processing is greatly reduced. This configuration reduces the need for computational resources and network resources, and increases operational efficiency.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claim section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in embodiments of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the embodiments may be coupled to one another as described or as shown. The coupling may be direct or indirect, without or with intervening items between coupled modules, units, or services. The coupling may be by physical contact or by communication between modules, units, or services.

System Overview and Function

FIG. 1A illustrates a device 100 according to several embodiments. The device 100 can be, or include, a communication and/or computing device, such as a mobile device, smartphone, tablet, subnotebook, laptop computer, desktop computer, personal digital assistant (PDA), gaming device, vehicular device, wearable device (e.g., smart wristwatch, smart eyeglasses, etc.), and/or any other device. The device 100 can include one or more components configured to receive, generate, store, process, modify, and/or determine information associated with images.

The device 100 can include a front side 102 and a back side 103. The front side 102 can include a display 104 and a front camera 106, and the back side 103 can include a back camera 108. The front camera 106 and the back camera 108 can capture still or moving images (e.g., high-resolution images, preview frames, video frames, depth frames, etc.). For example, the front camera 106, the back camera 108, or both can be configured to capture image frames in one or more formats (e.g., NV21, YUV 4:2:0, red-green-blue (RGB) bitmap, etc.) at a particular resolution and frame rate (e.g., 15 image frames per second, 30 image frames per second, 60 image frames per second, etc.).

The device 100 can execute an application (e.g., the application 414 described with reference to FIG. 4) residing on the device 100. The application can be associated with an entity such as a financial institution. Based on a user's interaction with the application, the entity can request an image of a document, such as the user's government-issued ID card. The application can receive the entity's request to capture and transmit an image of an object corresponding to the document. In response to receiving the request, the application can control the operation of the front camera 106 or the back camera 108 to capture, contemporaneously and continuously, image frames of the area within the field of view of the front camera 106 or the back camera 108 that includes the object. The application can render the captured image frames on the display 104.

Figure 1B:
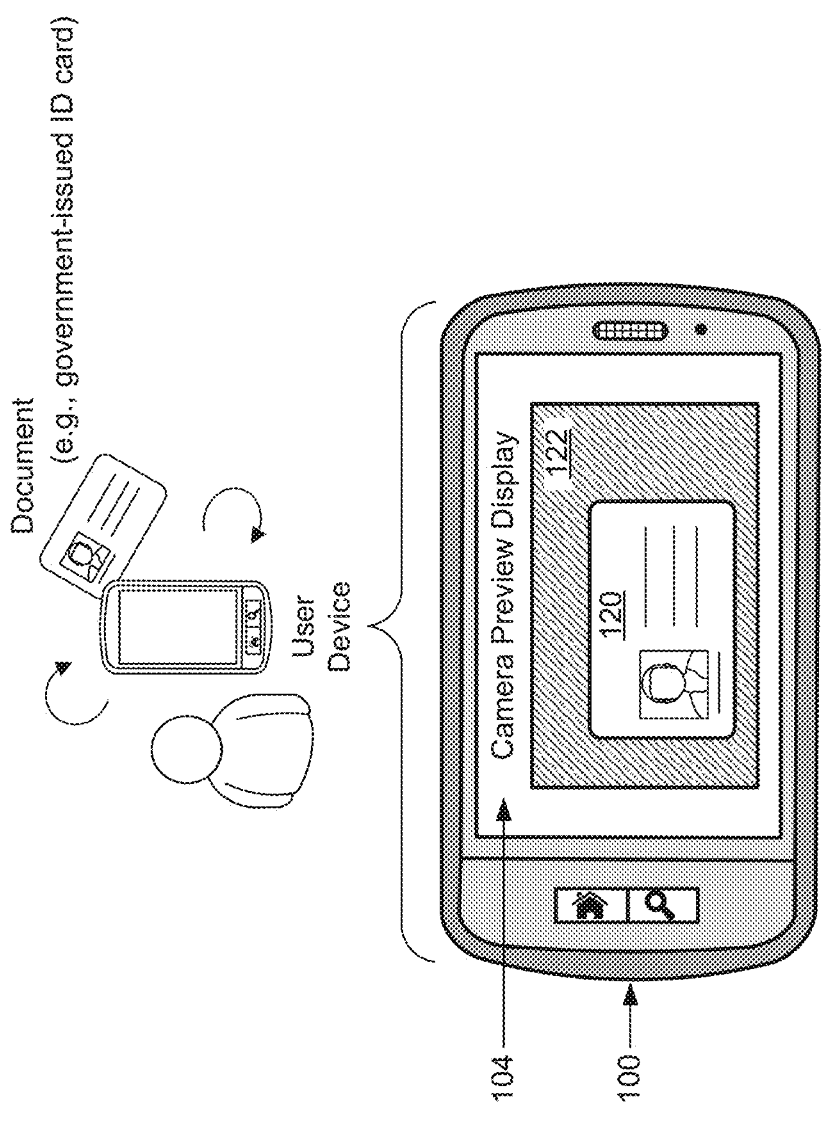

FIG. 1B shows a diagram of the device 100 positioned for capturing preview image frames of an object 120 placed on a background object 122 within the field of view of the camera (e.g., the back camera 108 described with reference to FIG. 1A) of the device 100. The object 120 can be a document, such as a government-issued ID card, a check instrument, or any other document for which an entity would have a need or desire to verify or authenticate such document. The background object 122 can be a background surface, such as a notebook or tabletop, on which the document has been set by the user. The object 120 can have about the same aspect ratio as, but a different size than, the background object 122. For example, both the object 120 and the background object 122 can be rectangular in shape, but the object 120 can be smaller than the background object 122. The device 100 can include a user interface configured to render each preview image frame of the object 120 and the background object 122, as captured by the camera, on the display 104 (e.g., the "Camera Preview Display" shown in FIGS. 1B and 1C).

Figure 1C:
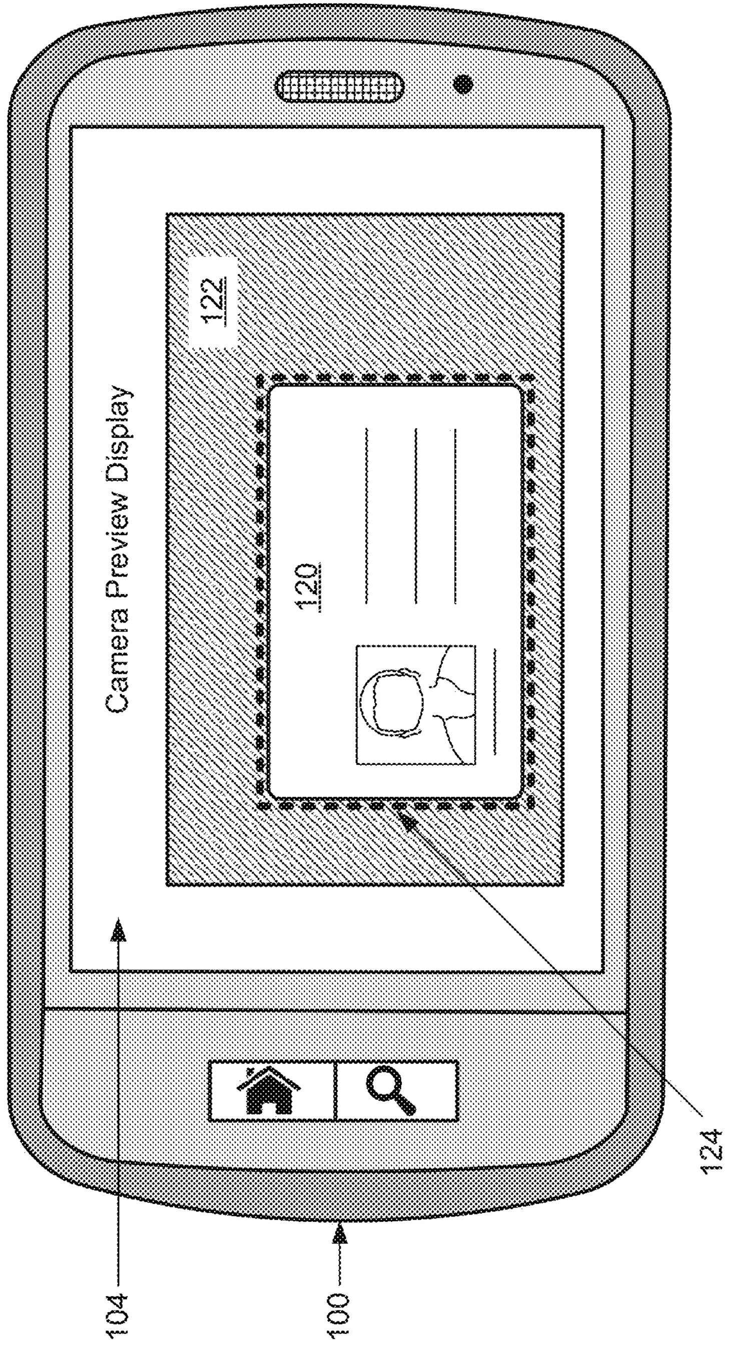

FIG. 1C shows a diagram of an outline 124 (e.g., a bounding rectangle, a boundary box, etc.) of the object 120 in a preview image frame. The application installed and executing on the device 100 can process each preview image frame in real-time to identify the outline 124 of the object 120, where the object 120 corresponds to a particular document type. For example, the outline 124 can be a boundary box overlaid by the application around the edges of the object 120 as rendered on the display 104. The application can move the outline 124 as the object 120 moves within the field of view of the camera or as the device 100 itself moves. The application can determine the size and shape of the outline 124 based on the size and shape of the object 120.

In several embodiments, the application installed and executing on the device 100 can implement an augmented reality (AR) platform (e.g., the AR platform 216 described with reference to FIG. 2; the AR platform 416 described with reference to FIG. 4), an image processing pipeline (e.g., the image processing pipeline 200 described with reference to FIG. 2), or both to determine the real-world size, aspect ratio, and other image parameters of the object 120 in each of the preview image frames based on the outline 124 of the object 120. The real-world size of the object 120 can include, for example, height ("H"), width ("W"), area, surface area, circumference, perimeter, volume, any other suitable parameter or characteristic, or any combination thereof. The aspect ratio of the object 120 can include, for example, a ratio of the width of the object 120 to the height of the object 120, or vice versa. The other image parameters of the object 120 can include, for example, glare, focus, contrast, resolution, distance of the object 120 with respect to the camera, angle of the object 120 with respect to the camera, any other suitable parameter or characteristic associated with the preview image frame including the object 120, or any combination thereof.

In several embodiments, by overlaying the outline 124 around the edges of the object 120, the application installed and executing on the device 100 can indicate to the user that the device 100 has successfully identified the object 120 to correspond to a predetermined document type based on the calculated real-world size and aspect ratio of the object 120. In response to determining that the object 120 corresponds to the predetermined document type based on the determined real-world size and aspect ratio of the object 120, the application can extract an image of the object 120, such as by cropping the object 120 from within the outline 124.

Figure 2:
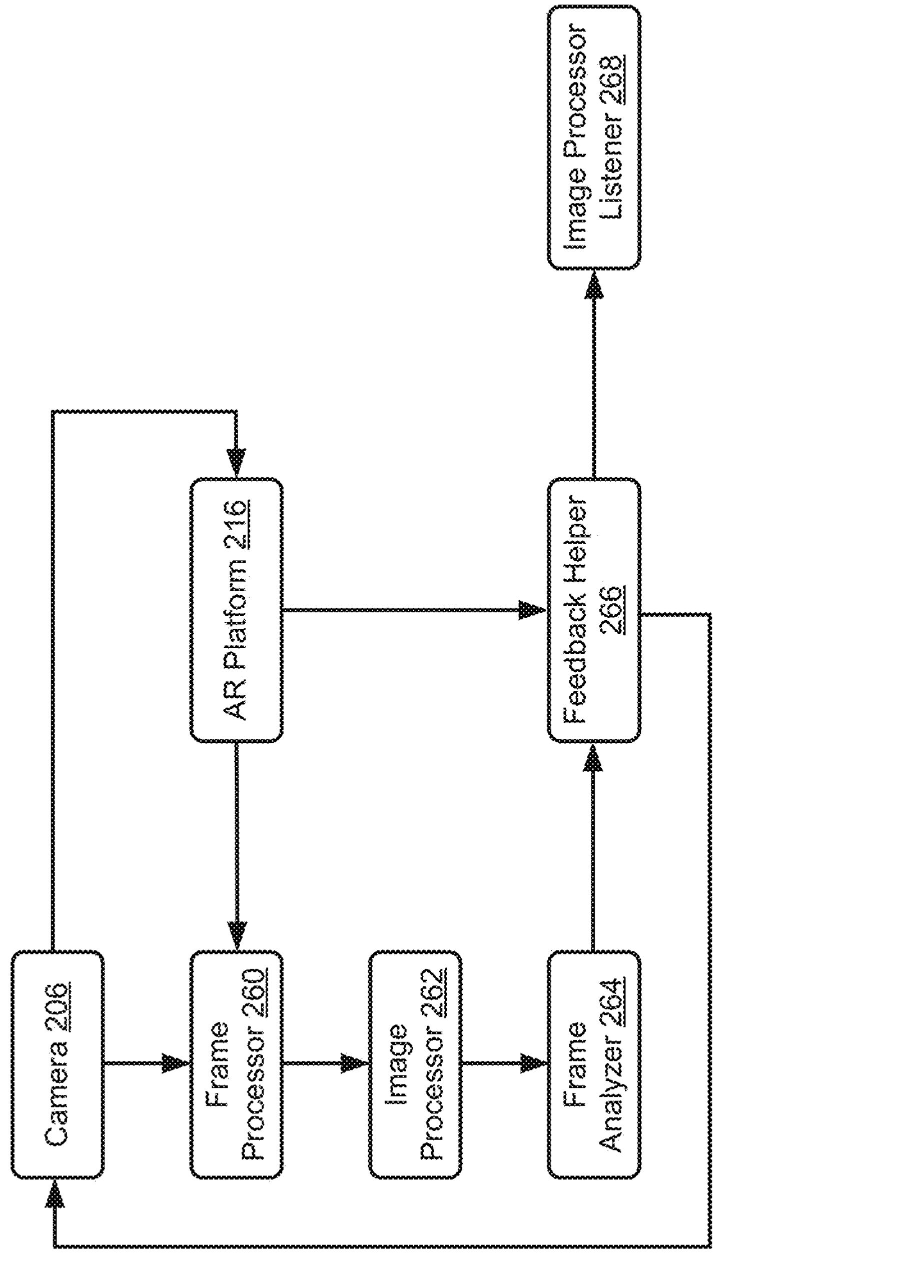
FIG. 2 is a block diagram of components of an image processing pipeline according to some embodiments.

FIG. 2 is a block diagram of components in an image processing pipeline 200 implemented by a device (e.g., the device 100 described with reference to FIGS. 1A, 1B, and 1C; the device 402 described with reference to FIG. 4), according to several embodiments. The device can include a camera 206 (e.g., the front camera 106 or the back camera 108 described with reference to FIGS. 1A and 1B; the front camera 406 or the back camera 408 described with reference to FIG. 4) configured to capture images and related data such as depth-of-field information. The device can further include a display (e.g., the display 104 described with reference to FIGS. 1A, 1B, and 1C; the display 404 described with reference to FIG. 4) configured to display, in real-time, the captured images (e.g., as a live preview) and render user interface data. The device can further include an application (e.g., the application 414 described with reference to FIG. 4) installed on the device. The application can include an AR platform 216, a frame processor 260, an image processor 262, a frame analyzer 264, a feedback helper 266, and an image processor listener 268 for automatically capturing an image of an object in a field of view of the camera 206.

The camera 206 can capture, in real-time, preview image frames of an object within the field of view of the camera 206. The camera 206 can transmit each preview image frame (e.g., as an NV21 byte array) to the frame processor 260 and the AR platform.

The AR platform 216 can process each preview image frame received from the camera 206 to identify an object (e.g., an ID card) in the preview image frame. The AR platform 216 can process each preview image frame to determine a real-world size, aspect ratio, and other image parameters of the object identified in that preview image frame. The AR platform 216 can transmit, for each preview image frame, the determined real-world size, aspect ratio, and other image parameters of the object to the frame processor 260.

In several embodiments, the AR platform 216 can further determine values for contrast, glare, distance, focus, any other suitable parameter, or any combination thereof of each preview image frame. Before determining the focus or any other suitable value of each preview image frame, the AR platform 216 can remove or mask the background surrounding the identified object in that preview image frame. Subsequently, the AR platform 216 can determine whether the values for contrast, glare, distance, focus, any other suitable parameter, or any combination thereof for each modified image frame meet corresponding threshold values. In the event that one or more of these values meet the corresponding threshold values, the AR platform 216 can instruct the feedback helper 266 to permit the camera 206 to extract the image of the object. Conversely, in the event that one or more of these values do not meet the corresponding threshold values, the AR platform 216 can instruct the feedback helper 266 to restrict the camera 206 from extracting the image of the object (e.g., to ensure that only a high-resolution image of the object is extracted by the camera 206).

The frame processor 260 can correlate, for each preview image frame, the determined real-world size of the object received from the AR platform 216 to the image of the object in the corresponding preview image frame received from the camera 206. In embodiments that do not include the AR platform 216, the frame processor 260 can determine the real-world size, aspect ratio, and other image parameters of the object in each preview image frame using data captured by the camera 206, such as depth-of-field information. For each preview image frame, the frame processor 260 can package data received from the camera 206, data received from the AR platform 216 (including, but not limited to, the version of the preview image frame having its background removed or masked), and data generated by the frame processor 260 as enhanced preview image frame data. The frame processor 260 can transmit the enhanced preview image frame data to the image processor 262. In several embodiments, the frame processor 260 can transmit the enhanced preview image frame data to the image processor 262 only when the application installed and executing on the device that is implementing the image processing pipeline 200 has an auto capture mode enabled.

The image processor 262 can process the enhanced preview image frame data received from the frame processor 260 to aid in object recognition. For example, the image processor 262 can convert the preview image frame into a grayscale image to aid in object recognition. In another example, additionally or alternatively, the frame analyzer 264 can blur, filter, dilate, and/or perform other operations on the preview image frame to further aid in object recognition. The image processor 262 then can transmit the grayscale image to the frame analyzer 264.

The frame analyzer 264 can analyze the grayscale image received from the image processor 262 by performing various processing operations for object recognition. For example, the frame analyzer 264 can detect edges of an object of interest (e.g., object 120 described with reference to FIGS. 1B and 1C; object 320 described with reference to FIGS. 3A, 3B, and 3C) in the grayscale image, identify a shape based on the detected edges, define a bounding rectangle for the identified shape, and determine an outline (e.g., outline 124 described with reference to FIG. 1C; outline 324 described with reference to FIGS. 3A and 3B) of the object of interest based on the bounding rectangle. In several embodiments, to detect the edges of the object of interest, the frame analyzer 264 can use a computer vision technique to filter all detected objects in the grayscale image based on image parameters (e.g., aspect ratio, size, etc.) and track a position, size, rotation or any other suitable parameter of the detected objects from one frame to the next. In several embodiments, the frame analyzer 264 can blur, filter, dilate, identify contours, detect shapes, create bounding rectangles, filter bounding rectangles, determine contrast values, determine glare percentage values, determine distance-related ratio values, determine focus-related values, and perform other operations on the grayscale image to aid in aid in identifying the object of interest. Subsequently, the frame analyzer 264 can determine and identify, for each preview image frame and in real-time, an object of interest in the preview image frame that corresponds with a specified document type, and reject or disregard other objects that do not, based on the real-world sizes and aspect ratios of the identified objects in the preview image frame. The frame analyzer 264 can output these frame analysis results together with the enhanced preview image frame data to the feedback helper 266.

The feedback helper 266 can determine, based on the frame analysis results and the enhanced preview image frame data received from the frame analyzer 264, whether to provide real-time feedback to the user of the device related to contrast, glare, distance, focus, or other image parameters associated with the preview image frame. The feedback helper 266 can also determine whether to display the outline of an object of interest. The feedback helper 266 can determine whether the determined real-world size of the object of interest is within a specified threshold of the real-world size of a predetermined document type. Additionally or alternatively, the feedback helper 266 can determine whether the aspect ratio of the object of interest corresponds to a predetermined aspect ratio of a predetermined document type. Based on this analysis, the feedback helper 266 can generate a control signal that includes instructions to render feedback to the user of the device, overlay the outline around the object of interest, or both. The feedback helper 266 can transmit the control signal to the image processor listener 268.

In several embodiments, the feedback helper 266 can analyze the frame analysis results for multiple image frames and determine whether the values of image parameters (e.g., real-world size, aspect ratio, focus, etc.) associated with multiple preview image frames satisfy threshold values. As an example, in deciding on whether instruct the camera 206 to auto capture an image of an object of interest, the feedback helper 266 can determine an average of the values of each of the image parameters (e.g., an average of the values associated with glare, focus, real-world size, aspect ratio, or any other image parameter) across multiple image frames (e.g., the n most recently processed preview image frames, where n refers to an integer value greater than or equal to one). The feedback helper 266 can determine whether the average values of each of the image parameters fall within predetermined threshold values associated with the respective image parameters. In response to determining that all or some of the threshold values of the image parameters are satisfied by the average values, the feedback helper 266 can output instructions to the camera 206 that trigger the camera 206 to automatically capture an image of the object of interest, such as by extracting an image of the object of interest from the preview image frame.

The image processor listener 268 can cause a user interface generated by the application on the display of the device to render the feedback, overlay the outline, or both based on the control signal received from the frame analyzer 264.

The image processing pipeline 200 described herein significantly improves the state of the art from previous systems because it provides enhanced techniques for identifying and capturing objects of interest that correspond to a specified document type, such that any objects not corresponding to the specified document type are excluded from the captured image. As a result, the image processing pipeline 200 can more accurately identify an object that corresponds with a specified document type and, in turn, satisfies a request for an image of a document. This shortens and simplifies the image capturing process, which conserves computing resources, power resources, and memory resources of the device that would otherwise need to be expended in cases where images of objects that do not correspond to a specified document type are automatically captured. Additionally, this conserves computing resources, memory resources, and network resources associated with a backend platform that would be needed to process images of such "non-document" objects that are automatically captured. Additionally, the frame analyzer 264 can utilize frame analysis results from prior image frames to assist with determining the outline for an object in a current image frame. This reduces a quantity of calculations needed for processing image frames, which increases the overall speed of the image processing pipeline 200.

Figure 3A:
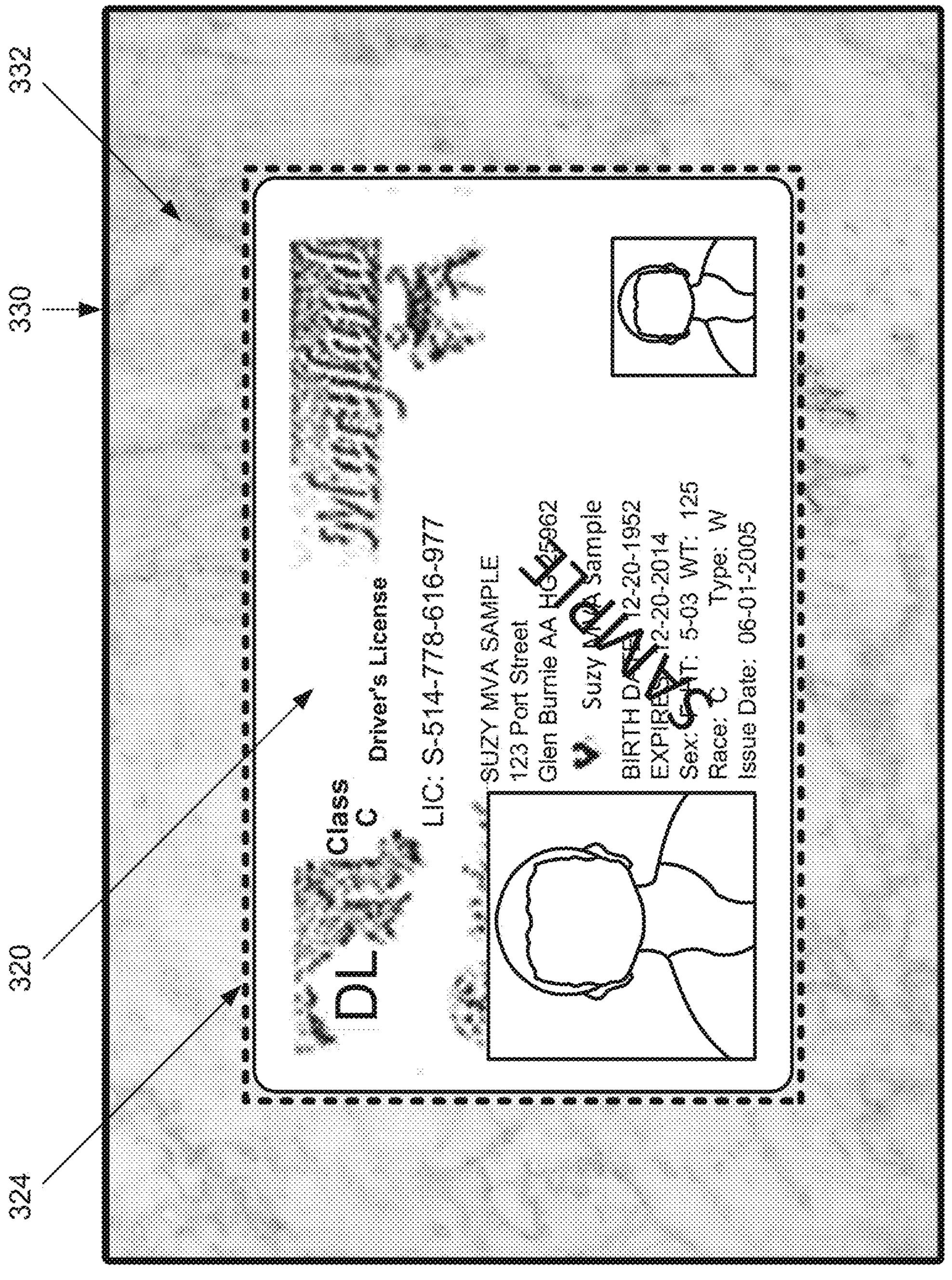
FIGS. 3A, 3B, and 3C are diagrams of image frames being processed during various stages of an example image processing pipeline according to some embodiments.
Figure 3B:
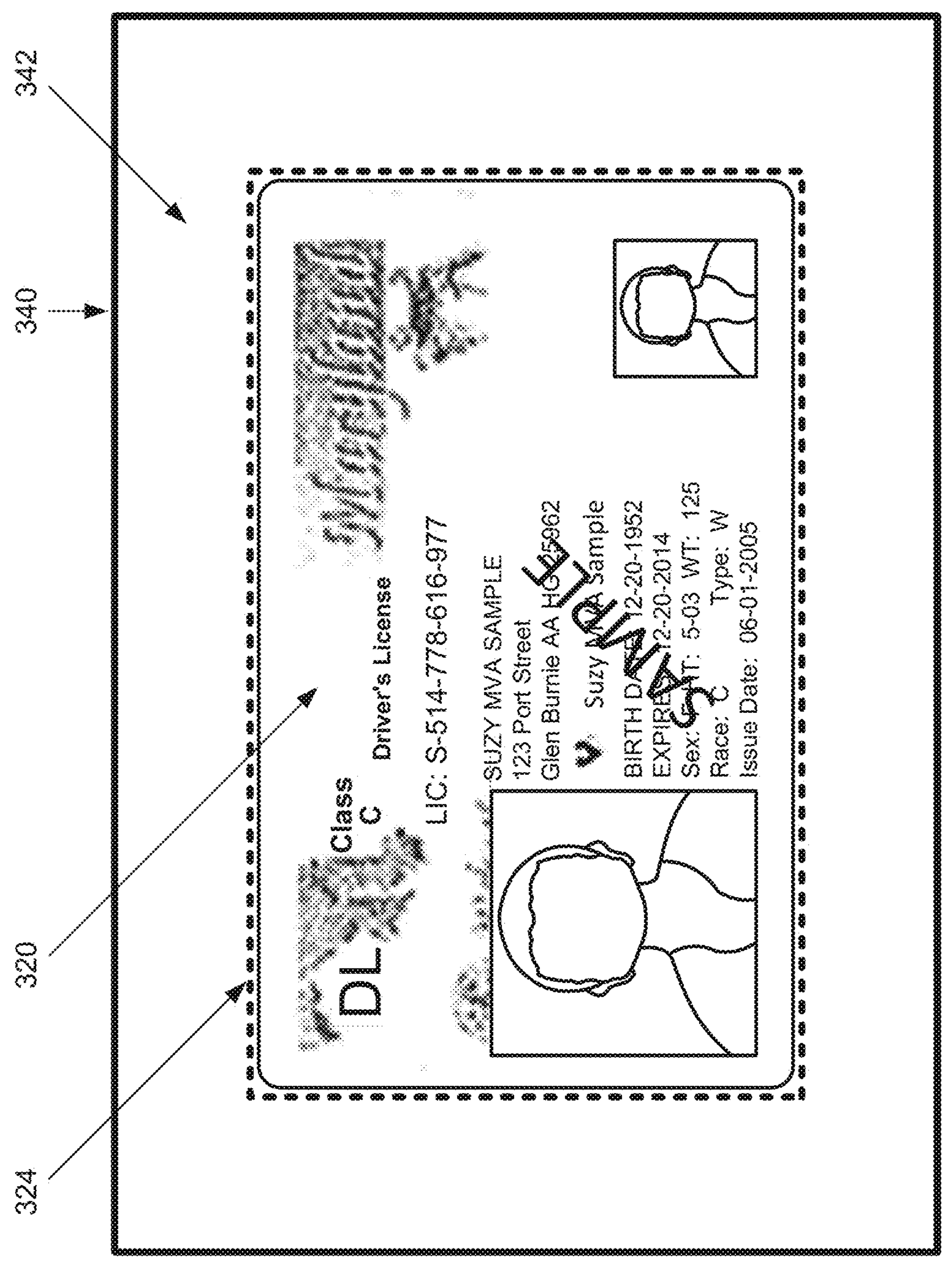
Figure 3C:
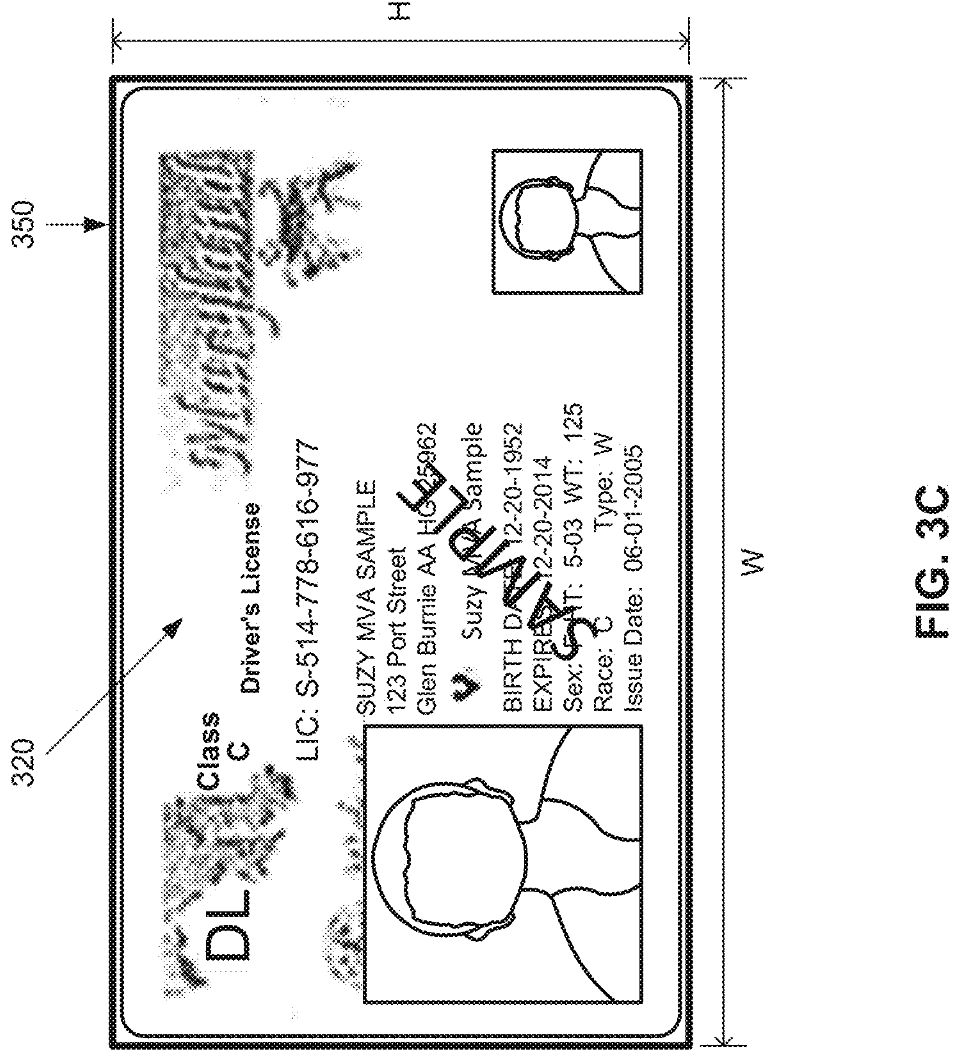

FIGS. 3A, 3B, and 3C are diagrams of example image frames as being processed during various stages of the image processing pipeline 200 described with reference to FIG. 2, according to several embodiments.

With reference to FIG. 3A, a preview image frame 330 can include a grayscale image of an object 320 on a background 332. The object 320 can be, for example, a government-issued ID card such as a state-issued driver's license. The background 332 can be a surface on which the object 320 has been set. In several embodiments, a filtering process can be executed on the bounding rectangles to determine an outline 324 of the object 320 that corresponds with a specified document type (e.g., government-issued ID card). The bounding rectangles can be determined based on an aspect ratio and/or a specified threshold size of the specified document type. For example, the real-world size of the outline 324 can be 3.4 in by 2.1 in for a government-issued ID card or banking card (e.g., credit card, debit card), 4.1 in by 2.9 in for a government-issued visa, and 4.9 in by 3.5 in for a government-issued passport in accordance with the ID-1, ID-2, and ID-3 formats, respectively, promulgated by International Organization for Standardization (ISO) and International Electrotechnical Commission (IEC) standard "ISO/IEC 7810 Identification cards-Physical characteristics."

In several embodiments, the real-world size, aspect ratio, and other image parameters of the object 320 can be determined based on the outline 324 of the object 320. The real-world size of the object 320 can include, for example, height ("H"), width ("W"), area, surface area, circumference, perimeter, volume, any other suitable parameter or characteristic, or any combination thereof. The aspect ratio of the object 320 can include, for example, a ratio of the width of the object 320 to the height of the object 320. For example, when the object 320 is oriented as a "landscape," the aspect ratio of the object 320 can include the width of the object 320 divided by the height of the object 320 (e.g., W/H aspect ratio=1.586 for a government-issued driving license having a real-world object size of W=3.370 inches (in) by H=2.125 in). In another example, when the object 320 is oriented as a "portrait," the aspect ratio of the object 320 can include the height of the object 320 divided by the width of the object 320 (e.g., H/W aspect ratio=1.420 for an ID page of a government-issued passport booklet having a real-world object size of H=4.921 in by W=3.465 in; H/W aspect ratio=1.294 for a government-issued long-form certificate of live birth having a real-world object size of H=11.0 in by W=8.5 in). Other image parameters of the object 320 can include, for example, glare, focus, contrast, resolution, distance of the object 320 with respect to the camera, angle of the object 320 with respect to the camera, any other suitable parameter or characteristic associated with the preview image frame including the object 320, or any combination thereof.

With reference to FIG. 3B, the preview image frame 330 can be masked to form a masked preview image frame 340 that includes the object 320 and a masked background 342. In one example, the masked background 342 can include, and the masked preview image frame 340 can be formed by replacing all of the pixels of the background 332 with only black pixels (or only white pixels, etc.) to generate the masked background 342.

In several embodiments, the focus value of each preview image frame 330 can be determined more consistently by replacing the background 332 with the masked background 342, or by removing the background 332 altogether, before determining the focus value of the respective preview image frame. In one example illustrating the inconsistency of focus values determined for preview image frames having backgrounds that have not been masked or removed, the focus value of a preview image frame that includes the object 320 placed on a colorful, patterned placemat can be substantially different (e.g., less) than the focus value of another preview image frame that includes the same object 320 but placed on a solid black desktop, even when the images were captured by the same camera and device. By masking or removing their backgrounds, the focus values of these two images can be rendered substantially equal, thereby improving the accuracy and consistency of auto capture techniques that are based on the focus value for a preview image frame exceeding a threshold value.

With reference to FIG. 3C, in response to determining that the determined focus value of the masked preview image frame 340 exceeds a threshold value, the modified preview image frame 350 can be obtained by extracting an image of the object 320 from the masked preview image frame 340 to remove the background 332.

Figure 4:
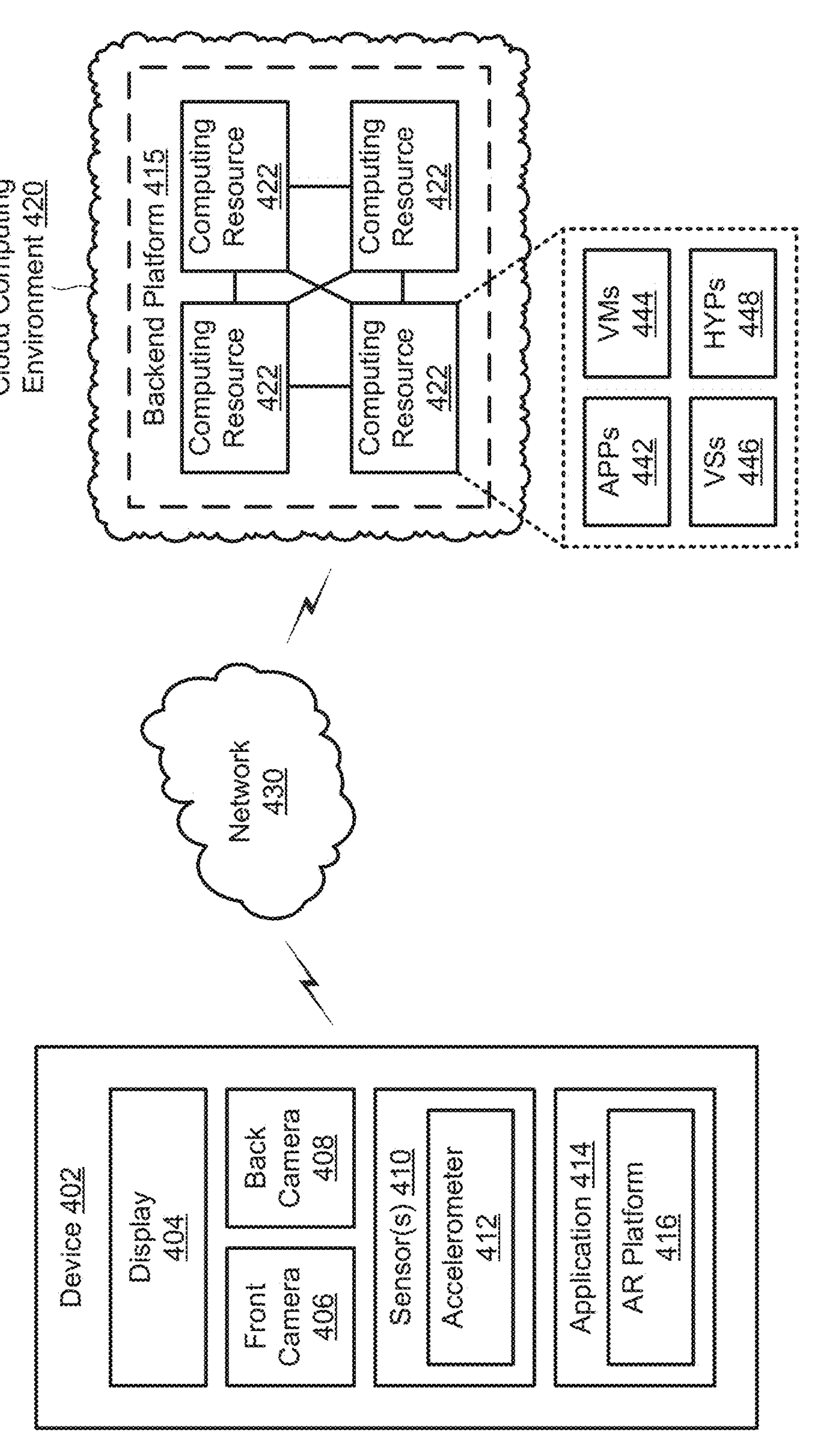
FIG. 4 is a block diagram of an example environment for automatically capturing images according to some embodiments.

FIG. 4 is a block diagram of an environment 400 in which the systems and methods described herein can be implemented. The environment 400 can include a device 402 (e.g., a mobile device such as a smartphone), a cloud computing environment 420 having a backend platform 415, and a network 430 that communicatively couples the device 402 and the cloud computing environment 420. The devices of the environment 400 can be connected to the network 430 through wired connections, wireless connections, or a combination of wired and wireless connections.

The device 402 can be, or include, a communication and/or computing device, such as a mobile device, smartphone, tablet, subnotebook, laptop computer, desktop computer, PDA, gaming device, vehicular device, wearable device, and/or any other device. The device 402 can include one or more components configured to receive, generate, store, process, modify, and/or determine information associated with images. For example, the device 402 can store data associated with the most recent modified preview image frames described herein in a temporary storage buffer. The data can include calculated sizes of objects, feature points in the modified preview image frames, coordinate mappings of the modified preview image frames, and any other suitable data, values, or characteristics associated with, for example, the last five modified preview image frames.

The device 402 can include a display 404, a front camera 406, a back camera 408, and one or more sensors 410 (e.g., one or more accelerometers, gyroscopes, ambient light sensors, capacitive touch sensors, etc.). The one or more sensors 410 can include an inertial measurement unit (IMU), such as an accelerometer 412 (e.g., a multi-axis, micro-electro-mechanical systems (MEMS) accelerometer chip).

The device 402 can further include an application 414 including an AR platform 416. The AR platform 416 can be embodied by any suitable AR platform (e.g., ARCore™ developed by Google Inc. of Mountain View, California). The AR platform 416 can be configured to provide for motion tracking, environmental understanding, light estimation, any other suitable functionality, and any combination thereof. The application 414 can further use a computer vision tool (e.g., OpenCV, developed by Intel, Inc. of Santa Clara, California and Willow Garage, Inc. of Menlo Park, California) for the real-time detection of edges in modified preview image frames used to determine the outlines of objects in the modified preview image frames. In several embodiments, the application 414 can implement, locally on the device 402, an image analysis and processing pipeline (e.g., the image processing pipeline 200 described with reference to FIG. 2) to identify and automatically capture an image of an object 320 in a modified preview image frame 350 corresponding to a specified document type (e.g., a user's government-issued ID card).

The device 402 can transmit requests and other data to, and receive requests, indications, device attributes, and other data from, the cloud computing environment 420 via the network 430. The network 430 refers to a telecommunications network, such as a wired or wireless network. The network 430 can span and represent a variety of networks and network topologies. For example, the network 430 can include wireless communications, wired communications, optical communications, ultrasonic communications, or a combination thereof. For example, satellite communications, cellular communications, Bluetooth, Infrared Data Association (IrDA) standard, wireless fidelity (Wi-Fi), and worldwide interoperability for microwave access (WiMAX) are examples of wireless communications that can be included in the network 430. Cable, Ethernet, digital subscriber line (DSL), fiber optic lines, fiber to the home (FTTH), a portion of the Public Switched Telephone Network (PSTN), and plain old telephone service (POTS) are examples of wired communications that can be included in the network 430. Further, the network 430 can traverse a number of topologies and distances. For example, the network 430 can include a direct connection, personal area network (PAN), local area network (LAN), metropolitan area network (MAN), wide area network (WAN), or a combination thereof. For illustrative purposes, in the embodiment of FIG. 4, the environment 400 is shown with the device 402 and the cloud computing environment 420 as end points of the network 430. This, however, is an example and it is to be understood that the device 402 can have a different partition between the device 402, the cloud computing environment 420, and the network 430. For example, the device 402 and the cloud computing environment 420 can also function as part of the network 430.

The backend platform 415 can include one or more devices configured to receive, generate, store, process, and/or provide information associated with images. The backend platform 415 can include a server or a group of servers. In several embodiments, the backend platform 415 can be hosted in the cloud computing environment 420.

The cloud computing environment 420 refers to an environment that delivers computing as a service, whereby shared computing resources and services can be provided to the device 402, the backend platform 415, or both. The cloud computing environment 420 can provide computation, software, data access, storage, and/or other services that do not require end-user knowledge of a physical location and configuration of a system and/or a device that delivers the services. The cloud computing environment 420 can be implemented using the cloud computing resources of a public or private cloud. Examples of a public cloud include, without limitation, Amazon Web Services (AWS)™, IBM Cloud™, Oracle Cloud Solutions™, Microsoft Azure Cloud™, and Google Cloud™. A private cloud refers to a cloud computing environment that is similar to a public cloud but operated solely for a single organization.

The cloud computing environment 420 can include computing resources 422. Each of the computing resources 422 can include one or more personal computers, workstations, computers, server devices, or other types of communication and/or computing devices. The computing resources 422 can host the backend platform 415. The cloud resources can include compute instances (e.g., general purpose instances, compute optimized instances, memory optimized instances, storage optimized instances, accelerated computing instances, micro instances, etc.) executing in the computing resources 422. The computing resources 422 can communicate with each other via wired connections, wireless connections, or a combination of wired or wireless connections.

Computing resources 422 can include a set of cloud resources, such as one or more applications 442 ("APPs"), one or more virtual machines 444 ("VMs"), one or more virtualized storage systems 446 ("VSs"), and one or more hypervisors 448 ("HYPs").

The one or more applications 442 include one or more software applications that can be provided to or accessed by the device 402. The one or more applications 442 can include software associated with backend platform 415 and/or any other software provided across the cloud computing environment 420. In some aspects, the one or more applications 442 can send information to and/or receive information from one another via the one or more virtual machines 444. In some embodiments, one or more of the operations or functions described herein as being performed by the device 402, the application 414, or both can be performed by, or using, the cloud computing environment 420 (e.g., by backend platform 415). In such embodiments, although the application 414 can be installed on and execute locally on the device 402, the one or more applications 442 can provide some or most of the functionality described with reference to the application 414.

Each of the one or more virtual machines 444 includes a software implementation of a machine (e.g., a computer) that executes programs similar to a physical machine. Each of the one or more virtual machines 444 can be either a system virtual machine or a process virtual machine, depending upon its use and degree of correspondence to any real machine. A system virtual machine can provide a complete system platform that supports execution of a complete operating system (OS). A process virtual machine can execute a single program and can support a single process. The one or more virtual machines 444 can execute on behalf of a user (e.g., using the device 402) and/or on behalf of the backend platform 415. The one or more virtual machines 444 can manage infrastructure of cloud computing environment 420, such as data management, synchronization, or long duration data transfers.

The one or more virtualized storage systems 446 provide storage virtualization techniques using the storage systems and/or devices of the computing resources 422. The storage virtualization techniques can include, for example, block virtualization and file virtualization. Block virtualization refers to abstraction (or separation) of logical storage from physical storage so that the storage system can be accessed without regard to physical storage or heterogeneous structure. This separation can permit flexibility in how administrators manage storage for end users. File virtualization can eliminate dependencies between data accessed at a file level and location where files are physically store. This can enable optimization of storage use, server consolidation, and/or performance of non-disruptive file migrations.

The one or more hypervisors 448 provide hardware virtualization techniques that allow multiple operations systems (e.g., guest operating systems) to execute concurrently on a host computer, such as the computing resources 422. The one or more hypervisors 448 can present a virtual operating platform to the guest operating systems, and can manage the execution of the guest operating systems multiple instances of a variety of operating systems and can share virtualized hardware resources.

In a variety of embodiments, the application 414 can be installed and executed on the device 402. The application 414 can be associated with an entity that needs to verify a user's identification document or other document by determining whether an image of that document is authentic or fake, invalid, or otherwise irrelevant. The application 414 can require the user to use a camera of the device 402 to capture an image of the user's identification document in order to perform certain functions using the application 414. Based on user input, the application 414 can receive a request to capture an image of a document of a specified type.

In response to receiving the request, the application 414 can generate an automatic image capture control signal configured to control the operation of the front camera 406 or the back camera 408 to capture image frames having an object 320 and a background 332 within a field of view of the front camera 406 or the back camera 408. The object 320 can be, for example, an identification document selected from the group consisting of a government-issued identification card, a health insurance card, an employee identification card, an identification card issued by a non-government institution, and a combination thereof. In response to the automatic image capture control signal, the front camera 406 or the back camera 408 can capture, during a predetermined time interval, a sequence of preview image frames of the object 320 and the background 332, including, but not limited to, the preview image frame 330.

The application 414 can perform operations to remove or mask the background 332 of each preview image frame 330 of the sequence of preview image frames before calculating the focus values of the preview image frames. The application 414 can identify an outline 324 of the object 320 in the preview image frame 330. The application 414 can remove, based on the outline 324, the background 332 in the preview image frame 330 to generate the modified preview image frame 350. In one example, to remove the background 332, the application 414 can crop, based on the outline 324, the object 320 in the preview image frame 330 to generate the modified preview image frame 350. In another example, to remove the background 332, the application 414 can mask, based on the outline 324, the background 332 in the preview image frame 330 to generate the modified preview image frame 350. For instance, the background 332 can consist of multicolor pixels, and, to mask the background 332, the application 414 can replace, based on the outline 324, the multicolor pixels of the background 332 in the preview image frame 330 with black pixels to generate a masked background 342 in a masked preview image frame 340. The application 414 can then delete or otherwise disregard the masked background 342 in the masked preview image frame 340 based on the outline 324 to generate the modified preview image frame 350. Subsequently, the application 414 can determine a focus value of the modified preview image frame 350.

The application 414 can determine whether a predetermined amount of focus values of modified preview image frames (e.g., preview image frames whose backgrounds have been removed or masked) are greater than a threshold focus value corresponding to the device 402. The threshold focus value can be, for example, a value determined, or retrieved, by the application 414 based on the type, model, manufacturer, camera, or operating system of the device 402. In one illustrative and non-limiting example, threshold focus value can be higher for a newer model smartphone having a higher-quality camera and image processing software and lower for an older model smartphone having a lower-quality camera and image processing software. In response to determining that the predetermined amount of focus values are greater than the threshold focus value, the application 414 can automatically capture, via a camera of the device 402, an image of the object 320.

In several embodiments, the threshold focus value can be a first threshold focus value, and the application 414 can determine whether the predetermined amount of focus values are greater than a second threshold focus value different from the first threshold focus value. The second threshold focus value can be greater (e.g., higher) than the first threshold focus value. In response to determining that the predetermined amount of focus values are greater than the second threshold focus value, the application 414 can determine a minimum focus value of the modified preview image frames, a maximum focus value of the modified preview image frames, a mean focus value of the modified preview image frames, a standard deviation value of the modified preview image frames, a variance value of the modified preview image frames, any other suitable value or parameter, or any combination thereof. Subsequently, the application 414 can determine the first threshold focus value based on the minimum focus value, the maximum focus value, the mean focus value, the standard deviation value, the variance value, any other suitable value or parameter, or any combination thereof.

The application 414 can process each modified preview image frame 350 to determine whether the object 320 identified in the modified preview image frame 350 corresponds with a document of the specified type. To do so, the application 414 can execute the AR platform 416 to calculate a size (e.g., real-world or actual size) and aspect ratio of the object 320 in each modified preview image frame 350 based on the outline 324 of the object 320. The AR platform 416 can calculate the size and aspect ratio of the object 320 based on the outline 324 of the object 320. In some aspects, the front camera 406 or the back camera 408 can capture depth-of-field information while capturing each preview image frame 330, and the AR platform 416 can determine the size and aspect ratio of the object 320 further based on the depth-of-field information.

In several embodiments, the application 414 can convert each preview image frame into a grayscale image by normalizing the preview frame to a grayscale byte array. In several embodiments, the application 414 can convert the image frame to a byte array by discarding color channel data in the image frame, and retaining luminance channel data. The application 414 then can remove or mask the background to improve the stability and accuracy of focus value determinations. In several embodiments, the application 414 can further identify contours, detect shapes based on the identified contours, define bounding rectangles of the detected shapes, and perform a filtering process on the defined bounding rectangles to identify a bounding rectangle that has an aspect ratio and/or size that corresponds to an aspect ratio and/or size of a particular document or particular type of document (e.g., a government-issued ID such card such as a driver's license). Based on the identified bounding rectangle, the application 414 can determine the outline 324 of the object 320 in the preview image frame that corresponds to a given document type. The application 414 can use both the aspect ratio and the real-world size to confirm that the object actually corresponds to the given document type. The application 414 can use the real-world size of the object 320, for example, to distinguish the object 320 from another object having a similar aspect ratio as, but a different size than, the given document type. For example, the application 414 can use the real-world size to distinguish the ID page of the user's passport booklet (e.g., document type=government-issued passport) from a flat screen TV display showing text and pictures, a notebook, or another object that does not correspond to a given document type.

With respect to motion tracking, the AR platform 416 can use odometry and mapping to determine the position of the device 402 relative to the object 320, such as when the user is moving the device 402 around while attempting to capture an image of the user's ID card. For example, the AR platform 416 can identify feature points in the modified preview image frame 350 and use the feature points to compute a change in location of the device 402. Feature points can be visually distinct features (e.g., objects, surfaces, colors, etc.). Visual information in the modified preview image frame 350 can be combined with inertial measurements from the accelerometer 412 to determine the position and orientation of the front camera 406 or the back camera 408 relative to the object 320 over time (e.g., over a sequence of preview image frames or modified preview image frames). For example, the application 414 can monitor movements sensed by the accelerometer 412 while the front camera 406 or the back camera 408 captured the preview image frames. The application 414 then can determine the consistency of the calculated sizes and aspect ratios of the object 320 further based on the movement of the accelerometer 412. The application 414 can determine an accuracy of the calculated size and aspect ratio of the object 320 identified in each modified preview image frame 350 based on tilt motion and orientation data detected by the accelerometer 412 for that frame. Additionally or alternatively, the AR platform 416 can define the outline 324 of the object 320 as anchors. Anchors can be used by the AR platform 416 to track the position of the object 320 over time.

The application 414 can receive the calculated size and aspect ratio of the object 320 from the AR platform 416. In several embodiments, the application 414 can compare the calculated sizes and aspect ratios of the object 320 received from the AR platform 416 to determine a consistency in calculated sizes and aspect ratios of the object 320 across the one or more modified preview image frames. The application 414 can identify a final calculated size and aspect ratio of the object 320 based on calculated sizes and aspect ratios of the object 320 across the one or more modified preview image frames when the determined consistency meets a given threshold. In response to determining that the calculated sizes or aspect ratios of the object 320 across a first set of modified preview image frames vary more than a first threshold value specified for the device 402, the application 414 may not use the calculated sizes and aspect ratios from the first set of modified preview image frames to determine the final calculated size and aspect ratio of the object 320. Additionally or alternatively, in response to determining that the differences in the calculated sizes and aspect ratios of the object 320 across a second set of modified preview image frames are within a second threshold value specified for the device 402, the application 414 can use the calculated sizes and aspect ratios of the object 320 in the second set of modified preview image frames to determine the final calculated size and aspect ratio of the object 320. The application 414 can also determine average values of the calculated sizes and aspect ratios in the second set of modified preview image frames to determine the final calculated size and aspect ratio of the object 320.

The application 414 can determine that the object 320 corresponds to a predetermined document type when one or more of the calculated sizes and aspect ratios of the object 320 in one or more of the modified preview image frames are within a threshold size and correspond to a predetermined aspect ratio, respectively, associated with the predetermined document type. In response to determining that the size of the object 320 is within a threshold size and the aspect ratio of the object 320 corresponds to a predetermined aspect ratio, the application 414 can automatically extract a cropped image of the object 320 from the one or more modified preview image frames.

In one illustrative and non-limiting example embodiment, the object 320 can be a Maryland driver's license issued by the Maryland Motor Vehicle Administration, and the background 332 can be a book. The application 414 can determine that the real-world size of the object 320, but not the background 332, falls within threshold size of government-issued driving licenses of a specific jurisdiction or geographic area (e.g., Maryland, the United States, etc.). In response to determining that the real-world size of the object 320 falls within the threshold dimensions of a driving license of a specific jurisdiction or geographic area, the application 414 can determine that the object 320 corresponds to a state-issued driving license. Subsequently, the application 414 can overlay the outline 324 around the edges of the object 320 and extract an image of the object 320 by cropping the object 320 from within the outline 324, such that the object 320 is extracted from the remainder of the preview image frame.

METHODS OF OPERATION

Figure 5:
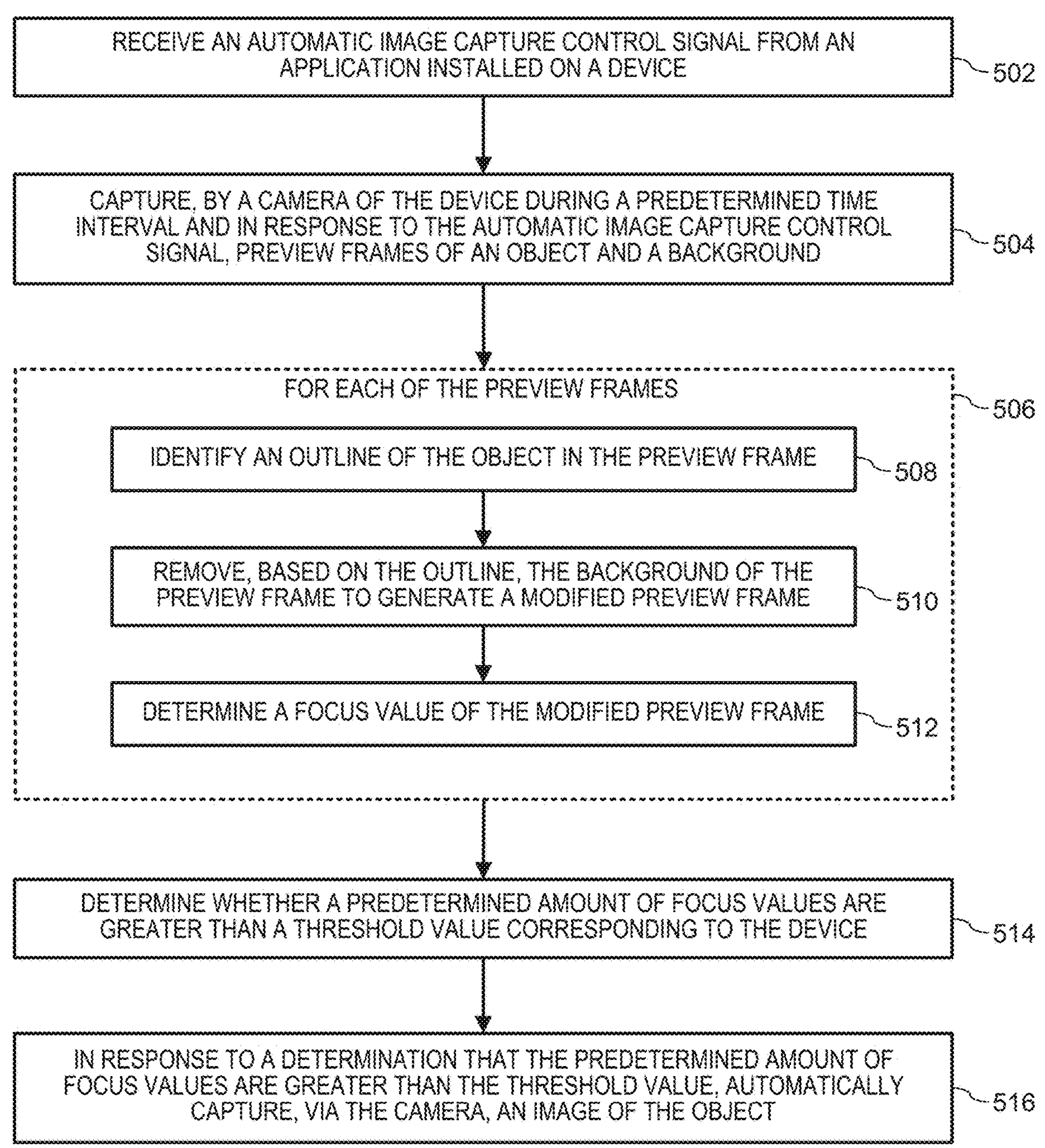
FIG. 5 illustrates an example method for automatically capturing images according to some embodiments.

FIG. 5 illustrates a method 500 of operating the device 100, the image processing pipeline 200, and/or the environment 400 to provide for automatically capturing images according to some embodiments. For example, method 500 indicates how the device 100 operates. In another example, method 500 can indicate how the image processing pipeline 200 operates. In yet another example, method 500 can indicate how the device 402 and the cloud computing environment 420 can operate.

Method 500 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 5, as will be understood by a person of ordinary skill in the art. Method 500 shall be described with reference to FIGS. 3A, 3B, 3C, and 4. However, method 500 is not limited to those example embodiments.

In several embodiments, operation 502 operates to allow the device 402 to receive an automatic image capture control signal from an application 414 installed on the device 402.

The application 414 may have generated the automatic image capture control signal responsive to a request, by an authentication service of the application 414, for an image and/or copy of an authentic government-issued ID card of the user of the application 414. For example, the application 414 may have generated the automatic image capture control signal upon the user opening an image capture service of the application 414 and pointing a camera (e.g., front camera 406, back camera 408) of the device 402 towards the ID card. The automatic image capture control signal can be configured to instruct the application 414 to determine a dynamic minimum focus threshold inside a region of interest in the image of the ID card to serve as an enhanced trigger for auto capture of the user's ID card without the background surrounding the ID card affecting the application 414's focus measurements.

In several embodiments, operation 504 operates to allow the device 402 to capture, by a camera (e.g., front camera 406, back camera 408) of the device 402 during a predetermined time interval and in response to the automatic image capture control signal, preview frames of an object 320 and a background 332. In several embodiments, the object 320 can be an identification document selected from the group consisting of a government-issued identification card, a health insurance card, an employee identification card, an identification card issued by a non-government institution, a check instrument, and a combination thereof. It is to be understood that the object 320 can include any document for which an entity would have a need or desire to verify or authenticate such document.

In several embodiments, operation 506 operates to allow the device 402 to perform operations for each preview image frame 330 of the preview frames, including, but not limited to, operations 508, 510, and 512.

In several embodiments, operation 508 operates to allow the device 402 to identify an outline 324 of the object 320 in the preview image frame 330.

In several embodiments, operation 510 operates to allow the device 402 to remove, based on the outline 324, the background 332 in the preview image frame 330 to generate a modified preview image frame 350.

In one example, to remove the background 332, operation 510 can operate to allow the device 402 to crop, based on the outline 324, the object 320 in the preview image frame 330 to generate the modified preview image frame 350.

In another example, to remove the background 332, operation 510 can operate to allow the device 402 to mask, based on the outline 324, the background 332 in the preview image frame 330 to generate the modified preview image frame 350. For instance, the background 332 can consist of pixels, and, to mask the background 332, operation 510 can operate to allow the device 402 to replace, based on the outline 324, the pixels of the background 332 in the preview image frame 330 with black pixels to generate a masked background 342 in a masked preview image frame 340. Subsequently, operation 510 can operate to allow the device 402 to delete (or otherwise disregard), based on the outline 324, the masked background 342 in the masked preview image frame 340 to generate the modified preview image frame 350.

In several embodiments, operation 512 operates to allow the device 402 to determine a focus value of the modified preview image frame 350.

In several embodiments, operation 514 operates to allow the device 402 to determine whether a predetermined amount of focus values of modified preview frames (e.g., without backgrounds or with masked backgrounds) are greater than a threshold focus value corresponding to the device 402. For instance, the threshold value can be based on the type, model, manufacturer, camera, or operating system of the device 402.

In several embodiments, in response to determining that the predetermined amount of focus values are greater than the threshold focus value, operation 516 operates to allow the device 402 to automatically capture, via the camera of the device 402, an image of the object 320.

Optionally, in several embodiments, the threshold focus value can be a first threshold focus value, and the method 500 can further include one or more operations that operate to allow the device 402 to determine whether the predetermined amount of focus values are greater than a second threshold focus value different from the first threshold focus value. In several embodiments, the second threshold focus value can be greater than the first threshold focus value. Optionally, in several embodiments, in response to determining that the predetermined amount of focus values are greater than the second threshold focus value, the method 500 can further include one or more operations that operate to allow the device 402 to determine a minimum focus value of the modified preview frames, determine a maximum focus value of the modified preview frames, determine a mean focus value of the modified preview frames, determine a standard deviation value of the modified preview frames, determine a variance value of the modified preview frames, and determine the first threshold focus value based on the minimum focus value, the maximum focus value, the mean focus value, the standard deviation value, and the variance value.

Components of the System

Figure 6:
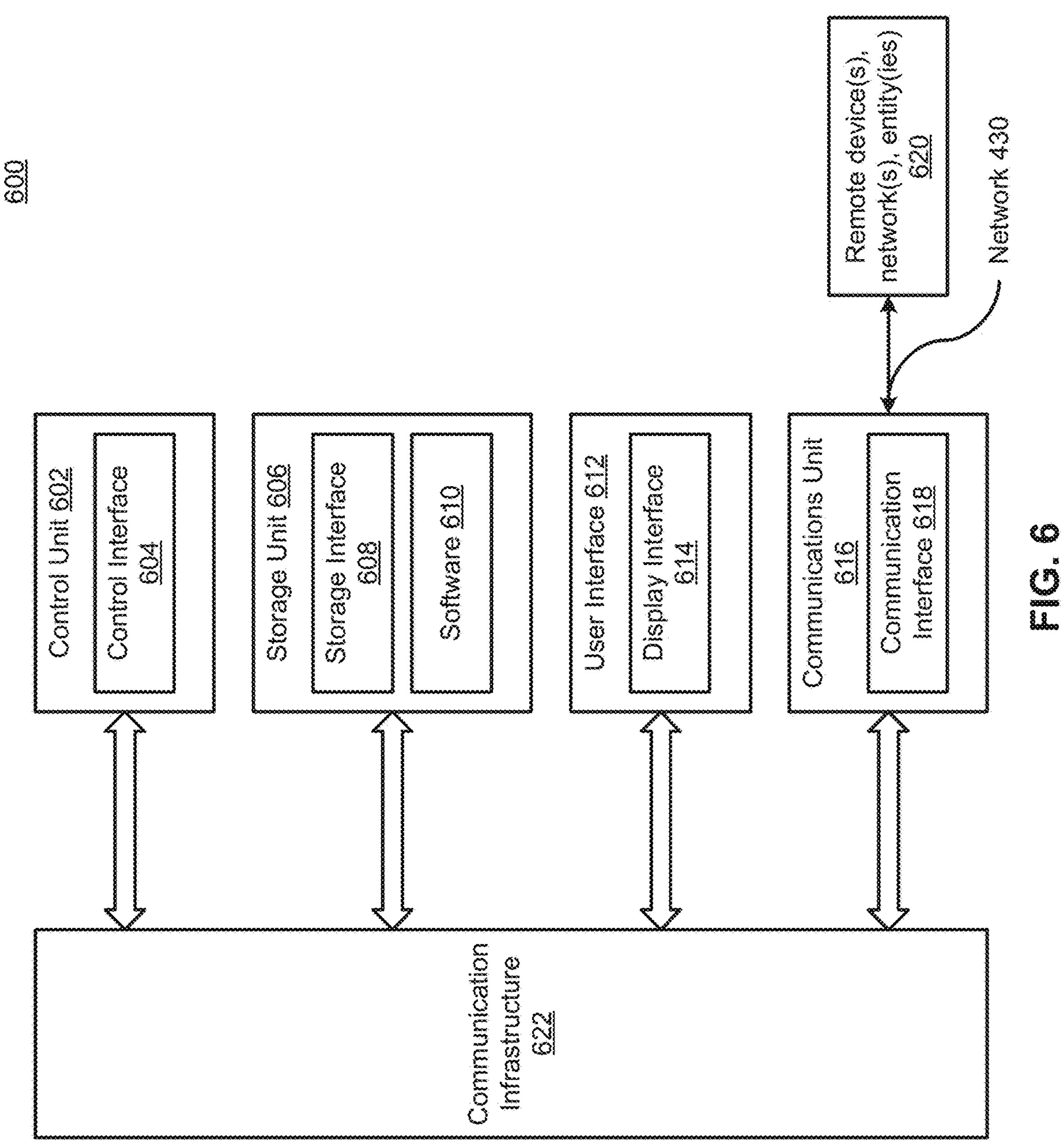
FIG. 6 is an example architecture of components implementing an example system for automatically capturing images according to some embodiments.

FIG. 6 is an example architecture 600 of components implementing the device 100, the image processing pipeline 200, and/or the devices of the environment 400 according to some embodiments. For example, the components of the architecture 600 may be implemented by any of the devices described with reference to the device 100, the image processing pipeline 200, and the environment 400.

In several embodiments, the components may include a control unit 602, a storage unit 606, a communication unit 616, and a user interface 612. The control unit 602 may include a control interface 604. The control unit 602 may execute software 610 to provide some or all of the machine intelligence described with reference to the device 100, the image processing pipeline 200, and the environment 400.

The control unit 602 may be implemented in a number of different ways. For example, the control unit 602 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 604 may be used for communication between the control unit 602 and other functional units or components of the device 100 or the image processing pipeline 200 or those described with reference to the environment 400. The control interface 604 may also be used for communication that is external to the functional units or components of the device 100 or the image processing pipeline 200 or those described with reference to the environment 400. The control interface 604 may receive information from the functional units or components of the device 100, the image processing pipeline 200, or the environment 400, or from the remote devices 620, or may transmit information to the functional units or components of the device 100, the image processing pipeline 200, or the environment 400, or to the remote devices 620. The remote devices 620 refer to units or components external to the device 100, the image processing pipeline 200, or the environment 400.

The control interface 604 may be implemented in different ways and may include different implementations depending on which functional units or components of the device 100, the image processing pipeline 200, the environment 400, or the remote devices 620 are being interfaced with the control unit 602. For example, the control interface 604 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 604 may be connected to a communication infrastructure 622, such as a bus, to interface with the functional units or components of the device 100, the image processing pipeline 200, the environment 400, or the remote devices 620.

The storage unit 606 may store the software 610. For illustrative purposes, the storage unit 606 is shown as a single element, although it is understood that the storage unit 606 may be a distribution of storage elements. Also for illustrative purposes, the storage unit 606 is shown as a single hierarchy storage system, although it is understood that the storage unit 606 may be in a different configuration. For example, the storage unit 606 may be formed with different storage technologies forming a memory hierarchical system including different levels of caching, main memory, rotating media, or off-line storage. The storage unit 606 may be a volatile memory, a nonvolatile memory, an internal memory, an external memory, or a combination thereof. For example, the storage unit 606 may be a nonvolatile storage such as nonvolatile random access memory (NVRAM), Flash memory, disk storage, or a volatile storage such as static random access memory (SRAM) or dynamic random access memory (DRAM).

The storage unit 606 may include a storage interface 608. The storage interface 608 may be used for communication between the storage unit 606 and other functional units or components of the device 100, the image processing pipeline 200, or the environment 400. The storage interface 608 may also be used for communication that is external to the device 100, the image processing pipeline 200, or the environment 400. The storage interface 608 may receive information from the other functional units or components of the device 100, the image processing pipeline 200, or the environment 400, or from the remote devices 620, or may transmit information to the other functional units or components of the device 100, the image processing pipeline 200, or the environment 400, or to the remote devices 620. The storage interface 608 may include different implementations depending on which functional units or components of the device 100, the image processing pipeline 200, the environment 400, or the remote devices 620 are being interfaced with the storage unit 606. The storage interface 608 may be implemented with technologies and techniques similar to the implementation of the control interface 604.

The communication unit 616 may enable communication to devices, components, modules, or units of the device 100, the image processing pipeline 200, the environment 400, or the remote devices 620. For example, the communication unit 616 may permit the functional units or components described with reference to the device 100, the image processing pipeline 200, or the environment 400 to communicate with each other. The communication unit 616 may further permit the devices of the device 100, the image processing pipeline 200, or the environment 400 to communicate with the remote devices 620 such as an attachment, a peripheral device, or a combination thereof through the network 430.

As previously indicated, the network 430 may span and represent a variety of networks and network topologies. For example, the network 430 may include wireless communication, wired communication, optical communication, ultrasonic communication, or a combination thereof. For example, satellite communication, cellular communication, Bluetooth, IrDA, Wi-Fi, and WiMAX are examples of wireless communication that may be included in the network 430. Cable, Ethernet, DSL, fiber optic lines, FTTH, and POTS are examples of wired communication that may be included in the network 430. Further, the network 430 may traverse a number of network topologies and distances. For example, the network 430 may include direct connection, PAN, LAN, MAN, WAN, or a combination thereof.

The communication unit 616 may also function as a communication hub allowing the device 100 or the image processing pipeline 200 to function as part of the network 430 and not be limited to be an end point or terminal unit to the network 430. The communication unit 616 may include active and passive components, such as microelectronics or an antenna, for interaction with the network 430.

The communication unit 616 may include a communication interface 618. The communication interface 618 may be used for communication between the communication unit 616 and other functional units or components of the device 100, the image processing pipeline 200, or the environment 400, or to the remote devices 620. The communication interface 618 may receive information from the other functional units or components of the device 100 or the environment 400, or from the remote devices 620, or may transmit information to the other functional units or components of the device 100, the image processing pipeline 200, or the environment 400, or to the remote devices 620. The communication interface 618 may include different implementations depending on which functional units or components are being interfaced with the communication unit 616. The communication interface 618 may be implemented with technologies and techniques similar to the implementation of the control interface 604.

The user interface 612 may present information generated by the device 100, the image processing pipeline 200, or the environment 400. In several embodiments, the user interface 612 allows a user to interface with the device 100, the image processing pipeline 200, the devices of the environment 400, or the remote devices 620. The user interface 612 may include an input device and an output device. Examples of the input device of the user interface 612 may include a keypad, buttons, switches, touchpads, soft-keys, a keyboard, a mouse, or any combination thereof to provide data and communication inputs. Examples of the output device may include a display interface 614. The control unit 602 may operate the user interface 612 to present information generated by the device 100, the image processing pipeline 200, or the environment 400. The control unit 602 may also execute the software 610 to present information generated by the device 100, the image processing pipeline 200, or the environment 400, or to control other functional units of the device 100, the image processing pipeline 200, or the environment 400. The display interface 614 may be any graphical user interface such as a display, a projector, a video screen, or any combination thereof.

CONCLUSION

The above detailed description and embodiments of the device 100, the image processing pipeline 200, and the environment 400 are not intended to be exhaustive or to limit the device 100, the image processing pipeline 200, or the environment 400 to the precise form disclosed above. While specific examples for the device 100, the image processing pipeline 200, or the environment 400 are described above for illustrative purposes, various equivalent modifications are possible within the scope of the device 100, the image processing pipeline 200, or the environment 400, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The device 100, the image processing pipeline 200, and the environment 400 are cost-effective, highly versatile, and accurate, and may be implemented by adapting components for ready, efficient, and economical manufacturing, application, and utilization. In addition, embodiments of the present disclosure valuably support and service the trend of reducing costs, simplifying systems, and/or increasing system performance.

Consequently, these and other valuable aspects of the embodiments of the present disclosure further the state of the technology to at least the next level. While the disclosed embodiments have been described as the best mode of implementing the device 100, the image processing pipeline 200, or the environment 400, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the disclosure is not to be restricted except in light of the attached claims and their equivalents.

What is claimed is:

1. A computer-implemented method for automatically capturing images, comprising:

capturing, by a camera of a device during a predetermined time interval, preview frames of an object and a background;

for each of the preview frames:

identifying an outline of the object in the preview frame, and removing, based on the outline, the background in the preview frame to generate a modified preview frame by masking the background based on the outline before determining a focus value of the preview frame, automatically capturing, via the camera, an image of the object once it is determined that the modified preview frame is in focus;

determining whether a calculated size and aspect ratio of the object in the modified preview frame is within a predetermined threshold size and corresponds to a predetermined aspect ratio, respectively, associated with a predetermined document type; and in response to determining that the calculated size of the object is within the predetermined threshold size and the calculated aspect ratio of the object corresponds to the predetermined aspect ratio, automatically extracting a cropped image of the object from the modified preview frame.

2. The computer-implemented method of claim 1, wherein the removing the background comprises cropping, based on the outline, the object in the preview frame to generate the modified preview frame.

3. The computer-implemented method of claim 1, wherein:

the background consists of pixels; and the masking the background comprises replacing, based on the outline, the pixels with black pixels to generate the modified preview frame.

4. The computer-implemented method of claim 1, the determining whether the modified preview frame is in focus comprises determining whether a predetermined amount of focus values corresponding to multiple preview frames are greater than a threshold focus value corresponding to the device.

5. The computer-implemented method of claim 4, wherein:

the threshold focus value is a first threshold focus value; and the computer-implemented method further comprises:

determining whether the predetermined amount of focus values are greater than a second threshold focus value different from the first threshold focus value; and in response to determining that the predetermined amount of focus values are greater than the second threshold focus value, determining a minimum focus value of the modified preview frames;

determining a maximum focus value of the modified preview frames;

determining a mean focus value of the modified preview frames;

determining a standard deviation value of the modified preview frames;

determining a variance value of the modified preview frames; and determining the first threshold focus value based on the minimum focus value, the maximum focus value, the mean focus value, the standard deviation value, and the variance value.

6. The computer-implemented method of claim 1, wherein the object is an identification document selected from a group consisting of a government-issued identification card, a health insurance card, an employee identification card, an identification card issued by a non-government institution, and a combination thereof.

7. A device for automatically capturing images, comprising:

a memory storing an application installed on the device;

a camera;

a display; and one or more processors in communication with the camera, the display, and the memory, and configured to:

capture, by the camera during a predetermined time interval, preview frames of an object and a background;

for each of the preview frames:

identify an outline of the object in the preview frame, and remove, based on the outline, the background of the preview frame to generate a modified preview frame by masking the background based on the outline before determining a focus value of the preview frame, automatically capture, via the camera, an image of the object once it is determined that the modified preview frame is in focus;

determine whether a calculated size and aspect ratio of the object in the modified preview frame is within a predetermined threshold size and corresponds to a predetermined aspect ratio, respectively, associated with a predetermined document type; and in response to a determination that the calculated size of the object is within the predetermined threshold size and the calculated aspect ratio of the object corresponds to the predetermined aspect ratio, automatically extract a cropped image of the object from the modified preview frame.

8. The device of claim 7, wherein to remove the background, the one or more processors are configured to crop, based on the outline, the object in the preview frame to generate the modified preview frame.

9. The device of claim 7, wherein:

the background consists of pixels; and to mask the background, the one or more processors are configured to replace, based on the outline, the pixels with black pixels to generate the modified preview frame.

10. The device of claim 7, wherein to determine whether the modified preview frame is in focus, the one or more processors are configured to determine whether a predetermined amount of focus values corresponding to multiple preview frames are greater than a threshold focus value corresponding to the device.

11. The device of claim 10, wherein:

the threshold focus value is a first threshold focus value; and the determination is a first determination; and the one or more processors are further configured to:

determine whether the predetermined amount of focus values are greater than a second threshold focus value different from the first threshold focus value; and in response to a second determination that the predetermined amount of focus values are greater than the second threshold focus value, determine a minimum focus value of the modified preview frames;

determine a maximum focus value of the modified preview frames;

determine a mean focus value of the modified preview frames;

determine a standard deviation value of the modified preview frames;

determine a variance value of the modified preview frames; and determine the first threshold focus value based on the minimum focus value, the maximum focus value, the mean focus value, the standard deviation value, and the variance value.

12. The device of claim 7, wherein the object is an identification document selected from a group consisting of a government-issued identification card, a health insurance card, an employee identification card, an identification card issued by a non-government institution, and a combination thereof.

13. A non-transitory computer readable medium storing instructions that, when executed by one or more processors of a device, cause the one or more processors to:

capture, by a camera of the device during a predetermined time interval, preview frames of an object and a background;

for each of the preview frames:

identify an outline of the object in the preview frame, and remove, based on the outline, the background of the preview frame to generate a modified preview frame by masking the background based on the outline before determining a focus value of the preview frame, automatically capture, via the camera, an image of the object once it is determined that the modified preview frame is in focus;

determine whether a calculated size and aspect ratio of the object in the modified preview frame is within a predetermined threshold size and corresponds to a predetermined aspect ratio, respectively, associated with a predetermined document type; and in response to a determination that the calculated size of the object is within the predetermined threshold size and the calculated aspect ratio of the object corresponds to the predetermined aspect ratio, automatically extract a cropped image of the object from the modified preview frame.

14. The non-transitory computer readable medium of claim 13, wherein to remove the background, the instructions cause the one or more processors to crop, based on the outline, the object in the preview frame to generate the modified preview frame.

15. The non-transitory computer readable medium of claim 13, wherein:

the background consists of pixels; and to mask the background, the instructions cause the one or more processors to replace, based on the outline, the pixels with black pixels to generate the modified preview frame.

16. The non-transitory computer readable medium of claim 13, wherein to determine whether the modified preview frame is in focus, the instructions cause the one or more processors to determine whether a predetermined amount of focus values corresponding to multiple preview frames are greater than a threshold focus value corresponding to the device.

17. The non-transitory computer readable medium of claim 16, wherein:

the threshold focus value is a first threshold focus value;

the determination is a first determination; and the instructions cause the one or more processors to:

determine whether the predetermined amount of focus values are greater than a second threshold focus value different from the first threshold focus value; and in response to a second determination that the predetermined amount of focus values are greater than the second threshold focus value, determine a minimum focus value of the modified preview frames;

determine a maximum focus value of the modified preview frames;

determine a mean focus value of the modified preview frames;

determine a standard deviation value of the modified preview frames;

determine a variance value of the modified preview frames; and determine the first threshold focus value based on the minimum focus value, the maximum focus value, the mean focus value, the standard deviation value, and the variance value.

* * * * *